United States Patent [19]

Yamamoto

[11] Patent Number: 5,090,834
[45] Date of Patent: Feb. 25, 1992

[54] CONNECTION ARRANGEMENT AND METHOD OF FORMING THE SAME

[75] Inventor: Yoshimi Yamamoto, Shizuoka, Japan

[73] Assignee: Fuji Kiko Company, Limited, Tokyo, Japan

[21] Appl. No.: 316,974

[22] Filed: Feb. 28, 1989

[30] Foreign Application Priority Data

Feb. 29, 1988 [JP] Japan .................................. 63-46543

[51] Int. Cl.⁵ ................................................ B25G 3/28
[52] U.S. Cl. ..................................... 403/277; 403/248; 403/359; 403/157; 29/523
[58] Field of Search ................. 403/242, 248, 277, 280, 403/284, 359, 157; 29/523, 512

[56] References Cited

U.S. PATENT DOCUMENTS 3,405,982 10/1968 Krenn ............................. 403/359 X
4,010,533 3/1977 Pitner ..................................... 29/523
4,213,351 7/1980 Rowlinson .

FOREIGN PATENT DOCUMENTS 2134988 1/1972 Fed. Rep. of Germany .
2555343 6/1976 Fed. Rep. of Germany .
2353742 12/1977 France .
2329494 10/1978 France .
2488354 2/1982 France .
57-61820 4/1982 Japan .
61-28845 7/1986 Japan .
62-55012 11/1987 Japan .
137317 5/1920 United Kingdom .

*Primary Examiner*—Andrew V. Kundrat
*Attorney, Agent, or Firm*—Bachman & LaPointe

[57] ABSTRACT

A first of two members which are joined in a manner to undergo synchronous rotation is formed with a aperture which has a flower-like shape and which has a periphery which is essentially free of sharply angled portions. A hollow projection formed on one end of a shaft is forced into the aperture and then punched to assume the shape of the aperture and to caulk the two members together.

6 Claims, 3 Drawing Sheets

CONNECTION ARRANGEMENT AND METHOD OF FORMING THE SAME

BACKGROUND OF THE INVENTION

1. Field of the Invention

The present invention relates generally to a connection arrangement and more specifically to a connection arrangement suited for use in automotive steering shafts and the like and which enables desirable reductions in dimensions such as the cross-sectional area of the structural members while maintaining adequate structural strength.

2. Description of the Prior Art

Commonly used automotive steering columns generally comprise upper and lower shafts which are interconnected in a manner to permit the same to telescope together or otherwise collapse in an energy absorbing manner upon the application of a predetermined force such as tends to occur in automotive collisions.

The lower end of the lower shaft is usually connected by way of a universal joint to a steering gear box while the upper end of the upper shaft is connected to a steering wheel. In these prior art arrangements the upper shaft is either a solid or a pipe while the lower shaft portion is usually formed of hollow pipe or tubing. As will be appreciated it is essential that the connection between the lower shaft and the universal joint be securely provided in order to maintain the vital connection between the steering wheel and the steering gear box and therefore ensure that torque can be unfailingly transmitted therebetween even under applications of abnormally large torques.

The universal joint includes a yoke. In order to provide the required torque transmission connection it is necessary to ensure that the yoke and the lower end of the pipe defining the lower shaft, are fixedly and permanently connected together in a manner which can tolerate the application of the above mentioned large torque loads.

In this connection, the prior art arrangements formerly have formed a projection portion on the lower end of the pipe and a correspondingly shaped opening in the middle of the yoke. The projection has been simply inserted into the opening and the two members fixed together by welding.

However, with the increasing demand for safe permanent connections which exhibit absolute reliability, an alternative arrangement has been devised wherein the end portion of the hollow pipe is press formed in a manner to define a projection which has a cross-section having either a hexagonal shape or an oblong shape with rounded ends. The yoke is formed with a correspondingly shaped opening and the projection is caulked or riveted in place after having been force fitted into place.

However, this arrangement has suffered from the drawback that, in order to ensure the connection will remain intact under heavy torque loads, the diameter of the tube is limited undesirably.

That is to say, with the above mentioned shapes (oblong or hexagonal) the forces produced by the torque applied act as shown in FIGS. 16 and 17. As will be noted, with the above mentioned shapes, the force distribution is such that the stress concentration produced by the torque applied to the shaft is high. Accordingly, in the case of the application of a large torque, the situation wherein the corners of the insert and the shapes formed in the yoke, round off or even strip, allow relative motion between the two parts and result in the loss of the desired connection therebetween.

SUMMARY OF THE INVENTION

It is an object of the present invention to provide an improved connection between two rotatable members such as the above mentioned yoke and lower shaft and which distributes the force applied to the interacting surfaces of the two members in a manner which permits the dimensions of the two members to be reduced desirably.

In brief, the above object is achieved by an arrangement wherein a first of two members which are joined in a manner to undergo synchronous rotation, is formed with an aperture which has a flower-like shape and which has a periphery which is essentially free of sharply angled portions. A hollow projection formed on one end of a shaft is forced into the aperture and then punched to assume the shape of the aperture and to caulk the two members together.

More specifically a first aspect of the present invention is deemed to comprise a structure which features: a member, said member having a shaped aperture therein, said shape being such as to have an essentially continuous peripheral wall which is free of sharp angles and corners; a hollow shaft; and an end portion formed on said hollow shaft, said end portion being inserted into said aperture and worked in a manner wherein the outer periphery of said end portion is in snug mating contact with the periphery of said aperture and the end of said end portion is caulked against said member in a manner to permanently connect said hollow shaft and said member.

A second aspect of the invention is deemed to comprise a steering shaft which features: a universal joint, said universal joint having a yoke; means defining a shaped aperture in said yoke, said shape being such as to have an essentially continuous peripheral wall which is free of sharp angles and corners; a hollow pipe, said hollow pipe forming a part of said steering shaft; and an end portion formed at one end of said hollow pipe, said end portion being smaller in cross-sectional area than the cross-sectional area of the pipe, said end portion being disposed through said shaped aperture, said end portion being selectively deformed in a manner wherein the outer periphery of said end portion is forced into intimate contact with the periphery of said opening, the end of said end portion being deformed outwardly in a manner to permanently connect said yoke and said hollow pipe.

A third aspect of the present invention is deemed to comprise a method of joining a structural member and a hollow pipe, the method featuring the steps of: forming a means defining a shaped aperture in said structural member, said shape being such as to have an essentially continuous peripheral wall which is free of sharp angles and corners; forming a reduced diameter end portion at one end of said hollow pipe; and inserting the reduce diameter end portion into said shaped aperture; inserting a tool into the open end of said end portion and deforming the end portion so that the outer periphery of said end portion is forced into intimate contact with the periphery of said shaped opening and the end of said end portion is flared out into engagement with said structural member.

A fourth aspect of the present invention is deemed to comprise a method of joining first and second members which features the steps of: forming an aperture in said first member, said aperture having a plurality of equidistantly spaced radially extending curved concavities and a plurality of equidistantly spaced radially extending curved convexities, said concavities each being arranged between two convexities and arranged to merge smoothly therewith in a manner wherein sharply angled portions are absent; forming a hollow projection on said second member; inserting said hollow projection into said aperture; forcing a shaped tool into said hollow projection and deforming said hollow projection in a manner wherein the external periphery of said hollow projection is forced to assume intimate contact with the periphery of said aperture; and flaring the end of the projection to combine the first and second members together.

BRIEF DESCRIPTION OF THE DRAWINGS

The various features and arrangements of the present invention and the attendant advantages thereof will become more clearly appreciated as a description of the preferred embodiment and the method of forming the same are given in conjunction with the appended drawings in which.

DETAILED DESCRIPTION OF THE PREFERRED EMBODIMENTS

Figure 1:
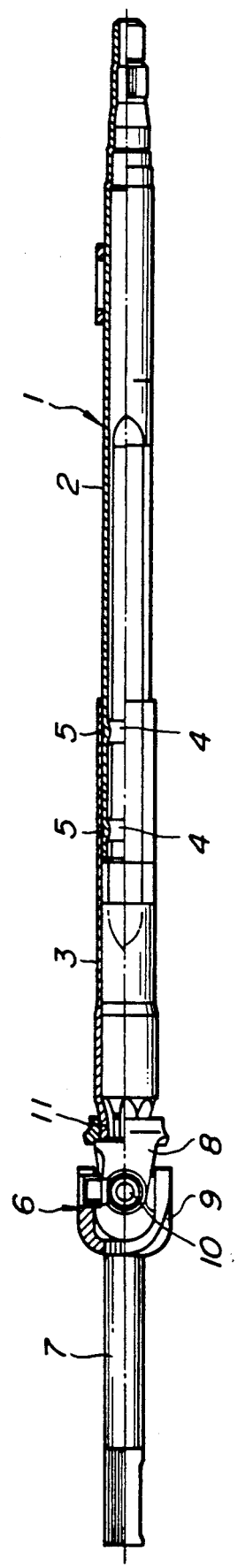
FIG. 1 is an elevation, partially in section, of a steering shaft equipped with joint according to the present invention.
Figure 2:
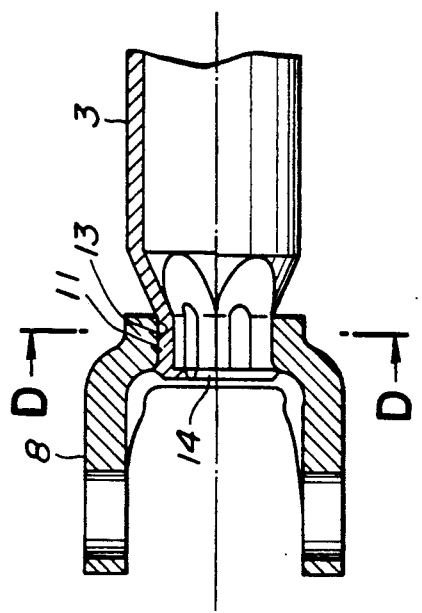
FIG. 2 is sectional elevation showing a connection between the shaft and the yoke according to the present invention.
Figure 3:
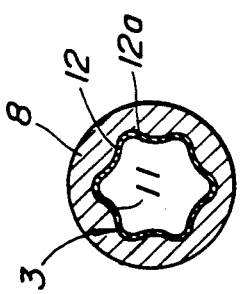
FIG. 3 is a sectional view as taken along section line D—D of FIG. 2.
Figure 5:
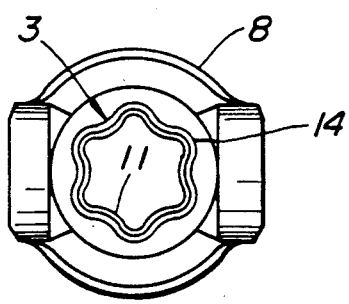
FIG. 5 is an end elevation showing the yoke and the caulking via which the yoke and shaft are fixedly joined together.
Figure 4:
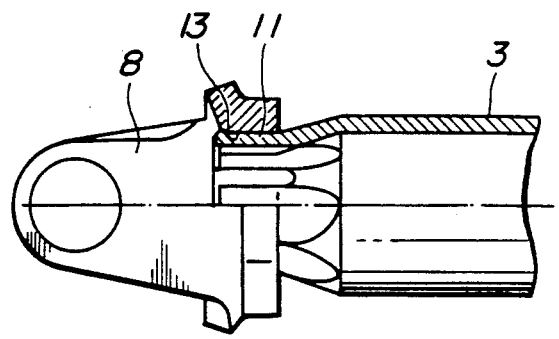
FIG. 4 is a side elevation (partially sectioned) showing the same arrangement as shown in FIG. 2.

FIG. 1 shows a steering shaft which embodies the present invention. This column consists of a hollow upper shaft section 2 and a lower hollow shaft 3 section. Both of these upper and lower shafts are formed of a relatively light weight pipe and are joined by an arrangement which is designed to permit the two sections to move relative to one another under the application of a predetermined force which acts along the axes thereof. This connection consists of annular recesses 4 which are formed in the portion of the upper shaft and filled with a resin 5.

As this type of joint is widely used and the invention is not limited to the use thereof, any number of other suitable types of arrangements being possible without deviating from the scope of the invention, no further description of the same will be given, it being deemed to be within the purview of one skilled in the art to which the present invention pertains to devise suitable alternatives if deemed appropriate.

A steering wheel (not shown) is connected to the upper end of the upper shaft while the lower end of the lower shaft is connected with a steering gear box (not shown) by way of a universal joint 6 and an intermediate shaft 7.

The universal joint 6 in this instance comprises first and second halves 8 and 9 each of which have bifurcate U-shaped yokes and which are operatively interconnected by a cross-shaped trunnion 10. Again it should be noted that the type of universal joint which is involved does not limit the scope of the present invention and that the connection which characterizes the invention can be used with any number of different types of rotatable elements.

Figure 7:
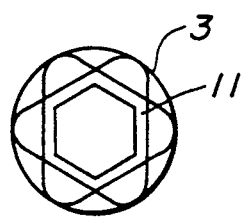
FIGS. 6 and 7 are respectively elevation and end views showing a shaft formed with a projection having a regular hexagonal cross-section.
Figure 6:
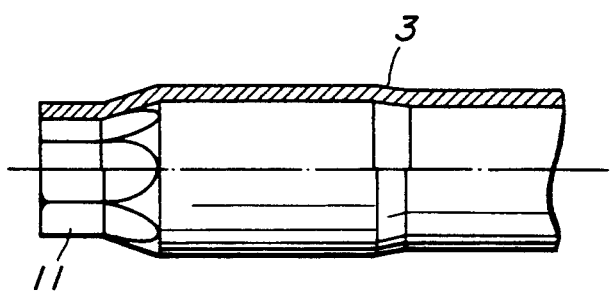
Figure 9:
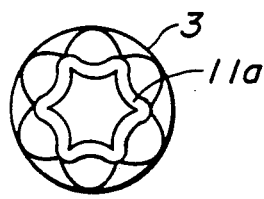
FIG. 8 and 9 are respectively elevation and end views showing a shaft formed with a projection having a cross-sectional shape according to the present invention.
Figure 8:
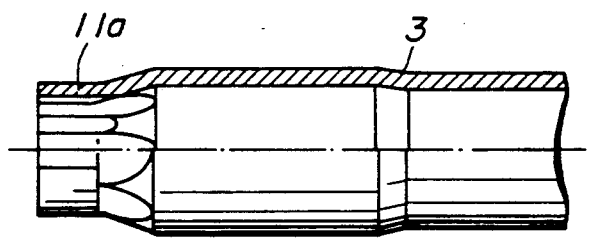
Figure 11:
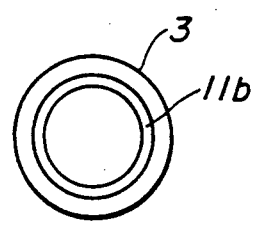
FIGS. 10 and 11 are respectively elevation and end views showing a shaft having a projection which has a circular cross-section.
Figure 10:
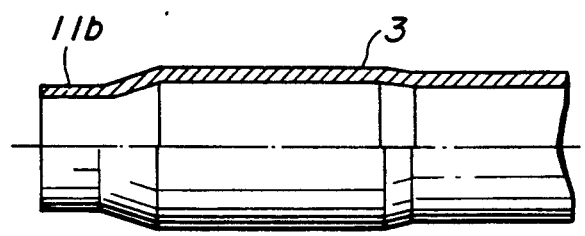
Figure 12:
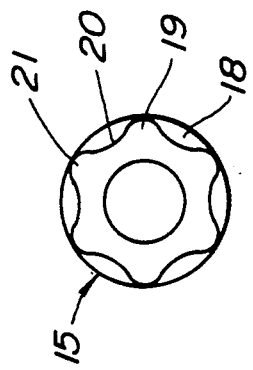
FIG. 12 is a end view of a yoke which is formed with a yoke according to the present invention.

The yoke 8 and the lower end of the lower shaft 3 are caulked or riveted together as shown in FIGS. 2 to 5. That is to say, as shown in FIGS. 6 and 7, the lower end of the lower shaft 3 is formed with a projection portion 11 having a regular hexagonal cross-section. On the other hand, the yoke 8 is formed with a "flower shaped" opening 13 therein having a shape of the nature shown in FIG. 12.

Figure 13:
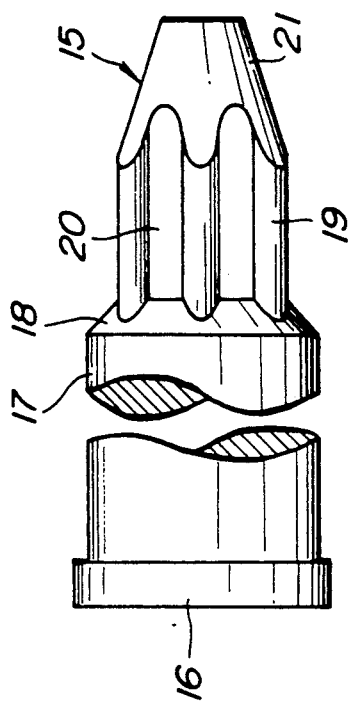
FIGS. 13 and 14 are respectively side and end elevational views showing the shape of a punch which is used in connection with the formation of the joint according to the present invention.
Figure 14:
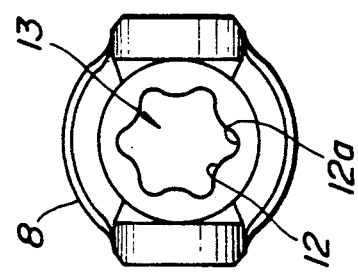

The projection portion 11 is forced into the aperture or opening 13 and a punch 15 of the nature shown in FIGS. 13 and 14 is driven into the mouth of the projection. This spreads the regular hexagonal shape 11 in a manner that the flat wall portions are deformed outwardly to intimately engage the inner periphery of opening 13 and assume the shape thereof.

In a second embodiment of the present invention, the lower shaft is formed with a projection 11a having a cross-section which is essentially similar to the one formed in the yoke. In a third embodiment the projection 11b is arranged to have an essentially circular cross-section.

In these embodiments the insertion of the punch 15 into the mouths of the projections induces a similar spreading and reshaping of the projection cross-section in a manner wherein it assumes the shape of the opening 13.

As shown in FIGS. 13 and 14, the punch includes a base portion 16, a large diameter main body portion 17 and a taper 18 which is arranged to engage the end of the projection and to deform the same in a manner wherein it flares radially outward. This caulks the two members together in the manner shown in FIG. 2.

The punch further includes a punch body portion 20 which includes a plurality of axially extending projections 19. These projections define shallow straight flutes therebetween. The projections 19 have a predetermined length and of course correspond in cross-sectional shape to the rounded corners of the shaped opening 13 formed in the yoke 8. The shapes of the shallow flutes or troughs defined between the projections corresponds to the shape of the radially inwardly extending convex shape portions which merge with the radially extending concavities or rounded corners.

The forward end 21 of the punch body has an essentially frusto conical shape which facilitates insertion and centering of the punch during the initial thrust into the mouth of the projections. The minimum diameter of the forward end 21 is chosen to be small enough to enter the mouth of extension without engaging the walls thereof.

The force "f" which is applied to the torque transmission wall surface "a" (see FIG. 15) can be shown to be such that:

$$f = T/3R \cdot \sin \Lambda \qquad (1)$$

wherein T denotes the torque and R denotes the radius at which the torque is applied.

Figure 16:
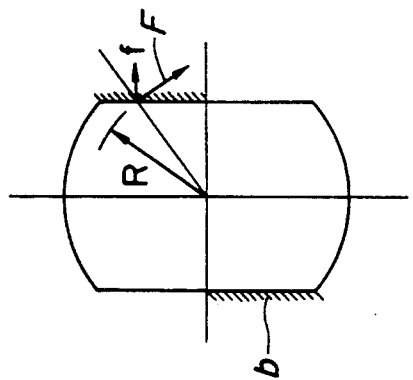
FIGS. 16 and 17 are diagrams showing the shapes used in the prior art arrangements discussed in the opening paragraphs of the instant disclosure, and the manner in which the torque generated forces are distributed therewith.

On the other hand, with the prior art, in the case of the force "$f_1$" which is applied to the torque transmission wall "b" of the oblong shaped (see FIG. 16) can be shown to be:

$$f_1 = T/R \cdot \sin \Lambda \qquad (2)$$

Figure 17:
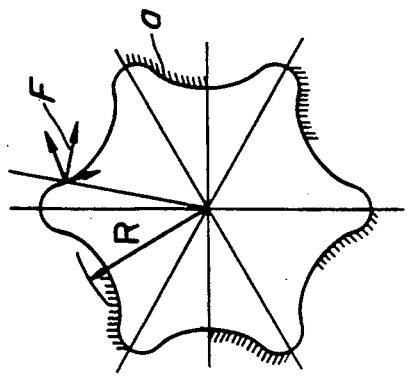

In the case of the hexagonal cross-section shown in FIG. 17 the force f2 which acts on wall "c" can be shown to be:

$$f_2 = T/3R \cdot \sin \Lambda \qquad (3)$$

Figure 15:
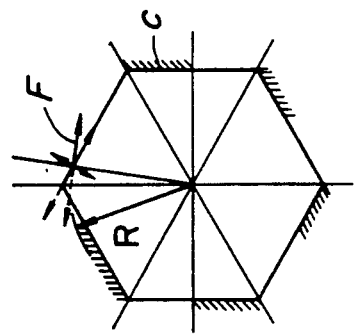
FIG. 15 is a diagram showing the "flower" shape which characterizes the present invention and the manner in which the forces are generated between the engaging surfaces of the joint having the same.

However, as will be appreciated from the force diagrams of FIGS. 15 and 17, as the force component which acts normally to the surface in the FIG. 17 arrangement is less than that in FIG. 15, it can be deemed that "a" > "c" and thus it is possible, with the present invention, to reduce the diameter of the projection and the pipe from which the lower shaft is formed, as compared with a projection which has a regular hexagonal shape, and still maintain the desired torque transmission characteristics.

Further, with the "flower" shaped opening which characterizes the present invention, the sharp corners which are inherent in the oblong and hexagonal shaped openings, are eliminated and thus improves the structural strength of the arrangement by reducing the sites where cracks can originate easily.

Accordingly, with the present invention, the diameter and wall thickness of the pipe from which the lower shaft is formed can be reduced as compared with the prior art while maintaining adequate reliability. The weight of the steering shaft can accordingly be reduced desirably. Further, as the characteristic shape of the projection formed at the end of the lower shaft and the caulking operation which locks the yoke and the lower shaft permanently together, can be induced in a single punching operation, quick, easy and cost efficient production of the steering shaft is facilitated.

Additionally the shape of the projection portion formed at the end of the lower shaft can have a variety of cross-sectional shapes prior punching, adding an additional degree of design freedom.

What is claimed is:

1. An improved coupling structure comprising:
    a member having a shaped aperture therein, with said shape being such as to have an essentially continuous peripheral wall which is free from sharp angles and corners wherein said shape has a curved, regularly undulating shape;
    a hollow shaft; and
    an end portion on said hollow shaft, said end portion being inserted into said aperture and worked in a manner wherein the periphery of said end portion is in intimate contact with the periphery of said aperture and the end of said end portion is combined with said member in a manner to be press fitted to the inner periphery of said shaped aperture so that a permanent connection is obtained between said end portion of said hollow shaft and the inner periphery of said shaped aperture and to provide an improved connection therebetween.

2. A coupling structure according to claim 1 wherein the connection between the hollow shaft and shaped aperture distributes the force applied to the connecting surfaces and permits the dimensions thereof to be reduced.

3. A structure as claimed in claim 1 wherein said aperture comprises a plurality of equidistantly spaced radially extending curved concavities and a plurality of equidistantly spaced radially extending curved convexities, said concavities each being arranged between two convexities and arranged to merge smoothly therewith in a manner wherein sharply angled portions are absent.

4. In a steering shaft
    a universal joint, said universal joint having a yoke;
    means defining a shaped aperture in said yoke, said shape being such as to have an essentially continuous peripheral wall which is free of sharp angles and corners;
    a hollow pipe, said hollow pipe forming a part of said steering shaft; and
    an end portion formed at one end of said hollow pipe, said end portion being smaller in cross-sectional area than the cross-sectional area of the pipe, said end portion being disposed through said shaped aperture, said end portion being selectively deformed in a manner wherein the outer periphery of said end portion is forced into intimate contact with the periphery of said opening, the end of end portion being deformed outwardly in a manner to permanently connect said yoke and said hollow pipe.

5. A method of joining first and second members comprising:
    forming an aperture in said first member, said aperture having a plurality of equidistantly spaced radially extending curved concavities and a plurality of equidistantly spaced radially extending curved convexities, said concavities each being arranged between two convexities and arranged to merge smoothly therewith in a manner wherein sharply angled portions are absent;
    forming a hollow projection on said second member;
    inserting said hollow projection into said aperture;
    forcing a shaped tool into said hollow projection and deforming said hollow projection in a manner wherein the external periphery of said hollow projection is forced to assume intimate contact with the periphery of said aperture; and flaring the end of the projection to combine the first and second members together.

6. An improved coupling structure comprising:
a member having a shaped aperture therein, with said shape being such as to have an essentially continuous peripheral wall which is free from sharp angles and corners;
a hollow shaft; and
an end portion on said hollow shaft having a hexagonal cross-section, said end portion being inserted into said aperture and worked in a manner wherein the periphery of said end portion is in intimate contact with the periphery of said aperture and the end of said end portion is combined with said member in a manner to be press fitted to the inner periphery of said shaped aperture so that a permanent connection is obtained between said end portion of said hollow shaft and the inner periphery of a shaped aperture and to provide an improved connection therebetween.

* * * * *